United States Patent [19]

Guest

[11] Patent Number: 4,657,286
[45] Date of Patent: Apr. 14, 1987

[54] TUBE COUPLINGS

[76] Inventor: John D. Guest, "Iona", Cannonhill Way, Bray, Maidenhead, Berkshire, United Kingdom

[21] Appl. No.: 838,232

[22] Filed: Mar. 10, 1986

[30] Foreign Application Priority Data

Mar. 12, 1985 [GB] United Kingdom ................ 8506317

[51] Int. Cl.$^4$ ............................................. F16L 21/06
[52] U.S. Cl. ...................................... 285/323; 285/55; 285/351; 285/383; 285/369; 285/918
[58] Field of Search .................. 285/322, 323, 55, 383, 285/369, 351, 423, 918

[56] References Cited

U.S. PATENT DOCUMENTS

| | | |
|---|---|---|
| 2,669,465 | 2/1954 | Newell . |
| 3,459,445 | 8/1969 | Parkhill .......................... 285/383 X |
| 3,578,805 | 5/1971 | Dutton ................................ 285/55 |
| 3,811,710 | 5/1974 | Dula et al. . |
| 4,066,283 | 1/1978 | Gtruck ............................ 285/383 X |

FOREIGN PATENT DOCUMENTS

| | | |
|---|---|---|
| 749909 | 10/1970 | Belgium . |
| 2465944 | 3/1981 | France . |
| 604311 | 5/1960 | Italy ................................ 285/918 X |

*Primary Examiner*—Richard J. Scanlan, Jr.
*Attorney, Agent, or Firm*—Jeffers, Irish & Hoffman

[57] ABSTRACT

The disclosure relates to a tube coupling having a hollow tubular body having collet form couplings at either end thereof to receive and lock tubes in the body at either end. The body has an internal annular wall and an inner lines which extends over the wall shoulder and along the body to either side of the annular wall shoulder towards the locations of the collets. The liner is formed from a material which is inert to the fluid to be passed through the tubes and has integral annular seals to seal with the tubes inserted in the body to prevent loss of fluid from the tubes into parts of the body not covered by the liner.

8 Claims, 2 Drawing Figures

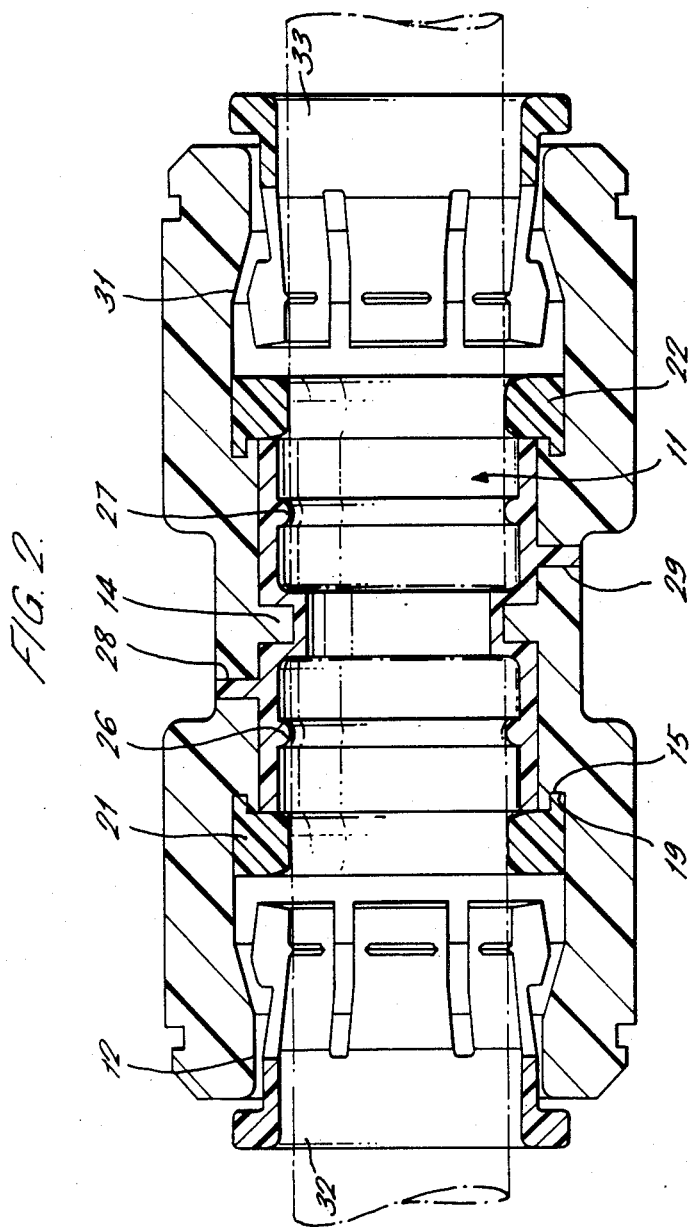

TUBE COUPLINGS

BACKGROUND OF THE INVENTION

1. Field of the Invention

This invention relates to tube couplings and is particularly although not exclusively applicable to tube couplings for potable water and domestic heating appliances.

2. Description of the Prior Art

Stringent regulations cover the use of couplings in potable water and domestic heating appliances and must be made from materials which are both hygienic where there is any possibility of contact with potable water and also rugged to withstand the different loads imposed. Traditionally materials which have been used for such couplings have been brass and cast iron but these are now becoming less acceptable to the relevant authorities.

Additional problems arise for couplings to be used for domestic central heating systems since the latter produce particularly corrosive acid/water mixtures which eat into many known materials otherwise suitable for such equipment. Materials such as polybutelene are considered to be satisfactory for such couplings but have the disadvantage that a significant curing time is required in the manufacture of couplings from such material and also a rather large section is required to provide adequate strength. Another possible material for such couplings is polyethelene but this has to have a substantial "soak" period of at least 24 hours in an autoclave.

SUMMARY OF THE INVENTION

This invention provides a tube coupling comprising a hollow body having a throughway to receive a tube from at least one end of the throughway, a releasable tube gripping device mounted in the throughway adjacent said one end, a seal encircling the throughway to seal with the outer periphery of the tube disposed adjacent the tube gripping device and a liner extending along the throughway from the seal and arranged with the seal to prevent fluid from the tube having direct contact with the wall of the hollow body, the seal and liner being formed from an inert material or materials.

The invention thus permits a tube coupling to be formed with an outer body of an engineering type material such as, for example, acetal copolymer and with an inner liner and seal formed from polymethylene material or silicon rubber which can be injection moulded inside the outer body.

A tube coupling wherein the throughway has an annular shoulder spaced along the throughway from said one end to provide a stop for engagement by an end of a tube inserted in the throughway from that end, the seal being disposed between the shoulder and the gripping device at the end of the throughway and the liner extending from the seal along the throughway and over the annular shoulder.

The seal may be formed integrally with and from the same material as the liner or the seal may be a separate component from the liner and engage an end of the liner.

The liner may comprise a polyethylene material or silicon rubber formed by injection moulding in the throughway.

The hollow body may have a throughway intended to receive tubes from both ends thereof to couple the tubes together, the throughway having releasable tube gripping devices at both ends of the throughway and seals being provided adjacent both ends of the throughway with a liner extending between the seals, the liner and seals being formed from an inert material or materials and being arranged to prevent contact of fluid flowing through the tubes with the wall of the hollow body.

The throughway may have an annular shoulder facing towards said one end thereof and against which the seal abuts to support the seal against movement along the throughway away from said one end.

The side of the seal engaging said annular shoulder may be formed with a projecting annular tongue which engages in an annular recess in said shoulder to assist in supporting the seal in the throughway.

BRIEF DESCRIPTION OF THE DRAWINGS

FIG. 2 illustrates a modification of the coupling of FIG. 1.

DESCRIPTION OF THE PREFERRED EMBODIMENTS

Figure 1:
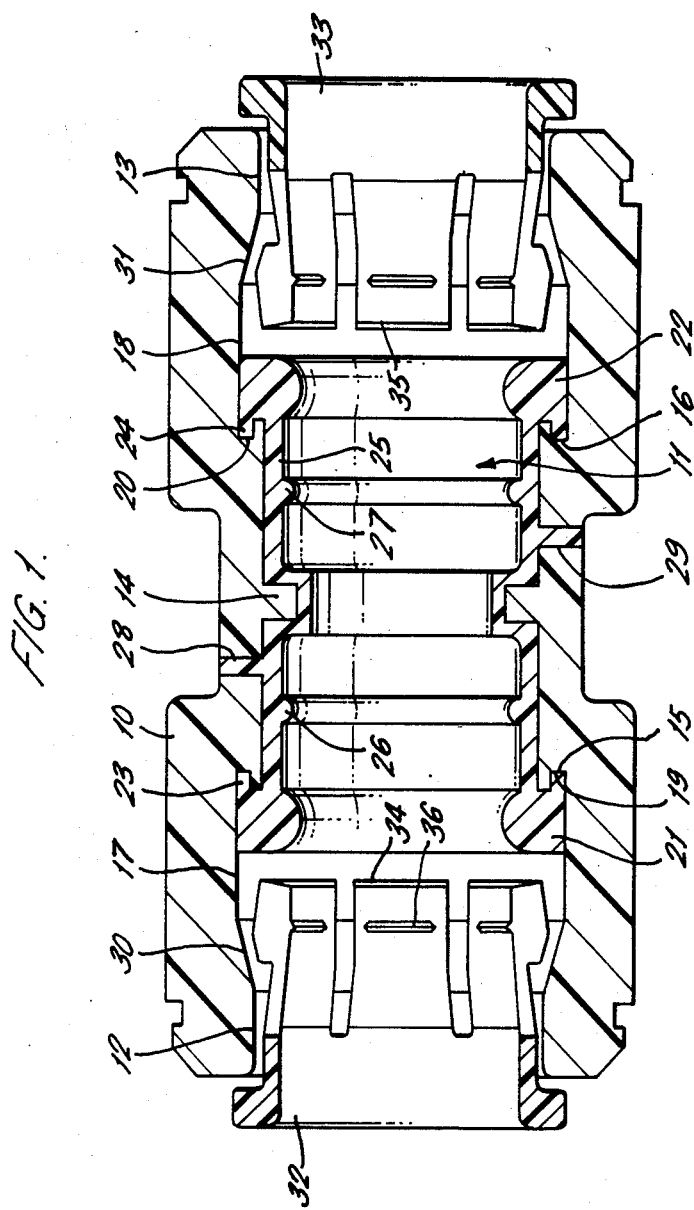
FIG. 1 is a sectional view through one form of double-ended tube coupling.

Referring firstly to the FIG. 1 of the drawings, there is shown a double-ended tube coupling for connecting two lengths of pipe (not shown) together and comprising an injection moulded acetal copolymer hollow generally tubular body 10 having a central throughway indicated at 11 and open ends 12 and 13.

Midway along the throughway 11 the body 10 has an integral annular wall 14 encircling the throughway to define a stop against which the ends of tubes inserted from either end of the throughway engage.

Partway along the throughway from the annular wall 14 towards each end 12, 13 of the throughway the wall of the throughway is stepped out at 15, 16 to form enlarged bores 17, 18 extending towards the open ends 12, 13 of the throughway. The steps or shoulders 15, 16 thus formed in the bore face towards the open ends 12, 13 of the throughway and each step has an annular recess, 19, 20 again facing towards the open ends of the throughway. Annular resilient seals 21, 22, are formed in the enlarged bores 17, 18, against the shoulders 15,16 to seal with the outer surfaces of tubes inserted into the throughway. Each seal has a resilient tongue 23, 24 and the tongues engage in the recesses 19, 20 to assist in supporting the seal in position.

The seals are formed integrally with a liner 25 which extends from seal to seal along the throughway and over the shoulder 14 midway along the throughway. Between the shoulder and each seal, the liner is formed with additional raised sealing ribs 26, 27 to engage the outer surfaces of the tube inserted in the throughway. The seal/liner are formed by injection moulding in the hollow body from polyethylene material or silicon rubber and the wall of the body is formed with bores 28, 29 on either side of the annular shoulder through which the material is injected in forming the seal/liner in the body.

The material of the resilient seals and liner is inert to potable water or water used in domestic central heating systems.

At the ends, 12, 13 of the body, the throughway is formed with tapering cams 30,31 reducing towards the ends of the body and collets 32,33 are disposed in the ends of the body and have resilient fingers 34, 35 extending into the body and formed with metal insert grips partway along the inner sides of the fingers for gripping a tube extending through the collet. The resilient fingers of the collets are compressed into engagement with the tubes extending through the collets by engagement with the outer sides of the resilient fingers with the cams 30,31 to hold the tubes in the throughway. The construction of the tube coupling is generally as described and illustrated in our U.K. Patent Nos. 1520742, 1573757, 2007322, 2051280 and 2052662 to which reference should be made.

It will of course be understood that other forms of locking devices for securing the tubes in the body may be employed such as conventional compression joints.

In use two tubes to be connected together are located in alignment to one another and the ends inserted in the coupling body through the collets, through the seals 21, 26 or 22, 27 and into engagement with the lined annular walls 14. The collets 32, 33 are pulled outwardly to force the resilient fingers of the collets into engagement with the tube surfaces and thereby lock the tubes in position. The seals 21, 26 and 22, 27 seal with the outer surfaces of the tube and thereby prevent loss of fluid from the coupling and, by virtue of the inert liner, the liquid flowing through the tube is prevented from coming into contact with any part of the outer body with which corrosive action could occur.

FIG. 2 shows a further embodiment of the invention which is generally similar to that described above except that the seals 21, 22 are formed separately from the liner 25 and may be of the same or of different material but in either case, would be formed from a material which is inert to the liquid to be conducted by the tubes connected by the coupling. The arrangement is otherwise similar to that described above.

It will be understood that the invention is not restricted to double-ended tube couplings as described above and is equally applicable to any form of tube coupling whatever the locking device provided in the coupling for holding the tube and whatever the format of the coupling whether it be a straight coupling, T-shaped, elbow or any other arrangement.

I claim:

1. A tube coupling comprising a hollow body having a throughway to receive a tube from at least one end of said throughway, a releasable tube gripping device mounted in the throughway adjacent said one end, a seal encircling the throughway to seal with the outer periphery of the tube disposed adjacent the tube gripping device and a liner extending along the throughway from the seal and arranged with the seal to prevent fluid from the tube having direct contact with the wall of the hollow body, the seal and liner being formed from inert material; wherein the improvement comprises providing an annular shoulder in the throughway spaced from said one end to provide a stop for engagement by an end of a tube inserted in the throughway, the liner extending along the throughway and over the annular shoulder to hold the liner in place in the throughway.

2. A tube coupling as claimed in claim 1 wherein the liner comprises a silicon rubber formed by injection molding in the throughway.

3. A tube coupling as claimed in claim 1 wherei the seal is formed integrally with and from the same material as the liner.

4. A tube coupling as claimed in claim 1 wherein the seal is a separate component from the liner and engages an end of the liner.

5. A tube coupling as claimed in claim 1 wherein the liner comprises a polyethylene material formed by injection moulding in the throughway.

6. A tube coupling as claimed in claim 1 wherein the hollow body has a throughway intended to receive tubes from both ends thereof to couple the tubes together, the throughway having releasable tube gripping devices at both ends of the throughway and seals being provided adjacent both ends of the throughway with a liner extending between the seals, the liner and seals being formed from an inert material or materials and being arranged to prevent contact of fluid flowing through the tubes with the wall of the hollow body.

7. A tube coupling as claimed in claim 1 wherein the throughway has an annular step facing towards said one end thereof and against which the seal abuts to support the seal against movement along the throughway away from said one end.

8. A tube coupling as claimed in claim 7 wherein the side of the seal engaging said annular step is formed with a projecting annular tongue which engages in an annular recess in said step to assist in supporting the seal in the throughway.

* * * * *